United States Patent [19]

Neefe

[11] Patent Number: 4,640,805
[45] Date of Patent: Feb. 3, 1987

[54] METHOD OF SELECTIVELY TINTING CAST LENSES

[76] Inventor: Charles W. Neefe, 811 Scurry St. P.O. Box 429, Big Spring, Tex. 79720

[21] Appl. No.: 785,247

[22] Filed: Oct. 7, 1985

[51] Int. Cl.$^4$ .............................................. B29D 11/00
[52] U.S. Cl. ........................................ 264/1.1; 8/507; 264/2.1; 351/162
[58] Field of Search .................. 264/2.1, 1.1, 1.7, 2.6; 8/507; 351/162

[56] References Cited

U.S. PATENT DOCUMENTS

| | | | |
|---|---|---|---|
| 2,241,415 | 5/1941 | Moulton | 425/808 |
| 4,553,975 | 11/1985 | Su | 8/507 |
| 4,582,402 | 4/1986 | Knapp | 351/162 |

FOREIGN PATENT DOCUMENTS 1004424  9/1965  United Kingdom ................ 264/2.1

Primary Examiner—James Lowe

[57] ABSTRACT

A method of coloring predetermined areas of cast contact lenses by placing a coating of soluble dye on the mold surface in the area to be colored. The liquid lens monomer is added to the mold and dissolves the dye from the mold surface before being polymerized to form a solid contact lens. After being polymerized the lens containing the dye in its polymer structure is removed from the mold.

16 Claims, 4 Drawing Figures

METHOD OF SELECTIVELY TINTING CAST LENSES

BACKGROUND OF THE INVENTION

Hard contact lenses have been available in many colors for over twenty years. Iris patterns have been placed inside both hard and soft contact lenses. Hard lenses are colored by adding the colorants to the monomer in the liquid state and polymerizing the colored monomer to form the colored hard lens material. Iris pattern lenses, both hard and soft, are made by laminating the painted or printed iris pattern inside the lens material. Spin casting is one of the most used methods of producing soft contact lenses. The lenses are produced in concave rotating molds so that colored lenses with a clear peripheral area have not been produced. If the colored area is allowed to extend to the edge it will be most visible and unattractive as the soft lenses are larger than the iris and extend over and cover part of the white part of the eye.

Lathe cut colored soft lenses are made from clear material in the xerogel state and later hydrated to produce soft lenses. The lenses are then dyed to provide lenses having a colored center and a clear periphery. U.S. Pat. No. 4,447,474.

In spin casting the two optical surfaces of the lens are formed simultaneously during polymerization. The outer lens surface is shaped by contact with the smooth mold surface, and the inner lens surface is shaped by the joint action of centrifugal forces, gravity and of surface tension on the polymerization mixture. Since the mold diameter is normally between 8 and 14 milimeters, the influence of surface tension of the ultimate lens shape is quite substantial.

One attempt employed a laminated structure with a painted opaque replica of the iris sandwiched between a clear and usually opaque plastic member. The result was a thick heavy lens which was difficult to fabricate and difficult to wear. A later attempt employed a colored opaque porous member surrounding a clear cylinder from which the lens was cut by lathing. This resulted in a lens having a pupil and iris pattern and the porous member had tendencies to flake and chip at the edge. (U.S. Pat. No. 3,454,332—Siegel). A third generation of colored lenses provided a thin layer of colored opaque markings placed in a clear material. The opaque colored marking radiated from the center of the clear material in a geometric pattern.

U.S. Pat. Nos. 4,472,327 and 4,460,523 disclose methods of making cosmetic hydrogel contact lenses which alter the apparent color of the iris by employing small light reflecting particles imbedded in a colored transparent matrix.

It is commonly known that any transparent conventional colored contact lens placed on a dark colored iris has little or no effect toward changing the apparent color of the eye.

DESCRIPTION OF THE PREFERRED EMBODIMENTS

SPIN CAST LENSES WITH A COLORED IRIS PATTERN ARE MADE AS FOLLOWS

Figure 1:
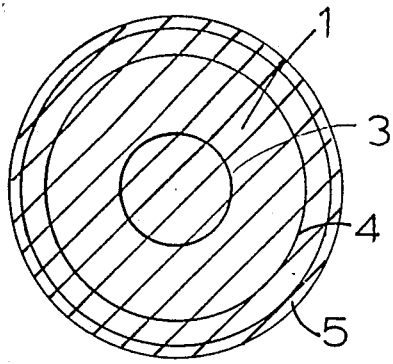
FIG. 1 shows the concave spin cast mold from the top with the colorant in place.
Figure 2:
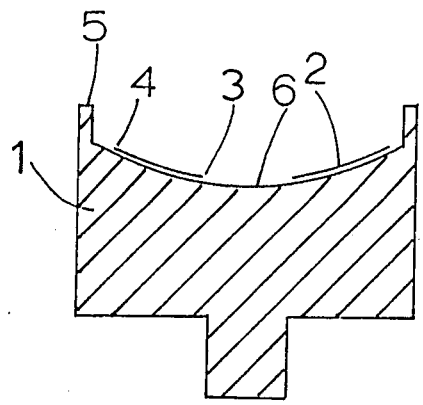
FIG. 2 shows the concave spin cast mold in section with the colorant in place.
Figure 4:
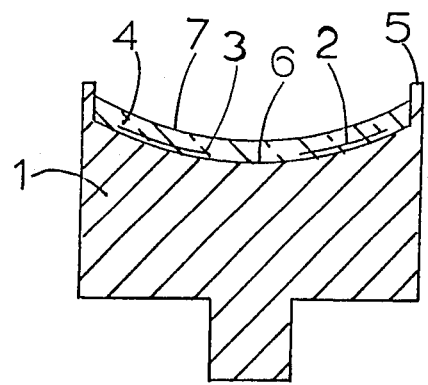
FIG. 4 shows the concave spin cast mold in section with the colorant and lens in the mold.

A concave spin cast mold 1 FIGS. 1, 2 and 4 is made from metal, glass or synthetic resins. Metal molds may be plated with gold or platinum. An optical concave surface 6 FIGS. 1 and 4 having the radius required on the convex lens surface is provided. A retaining ring 5 FIGS. 1, 2 and 4 controls the diameter of the spin cast lens. The speed of rotation around the lens optical axis perpendicular to the optical surface 6 FIGS. 2 and 4 determines the concave lens radius 7 FIG. 4. The quantity of liquid lens monomer added to the concave mold determines the lens thickness.

A dye pigment or other colorant which is soluble or may be suspended in the liquid lens monomer is applied to the concave spin cast mold surface 2 FIG. 2. Colorant is not applied to the entire mold surface. A peripheral ring is left uncolored. The outer edge of the colorant 4 FIGS. 1 and 2 provides a band around the periphery having no color. An uncolored central pupil zone may also be provided by the circular inner edge of the colorant 3 FIGS. 1 and 2.

The colorants are selected from the following:
Certified Drug and Cosmetic Colors
  D and C Green #6
  D and C Green #8
  D and C Violet #2
  D & C Blue #11651
  D & C Ice Blue
  D & C Brown #11903
  D & C Light Green #11501
  D & C Chlorophyl #11503
  D & C Brilliantine Green
  D & C Lilac Mixtures of colorants provide a wide range of color effects as any non-toxic soluble colorant may be used. Colorants which are transparent, translucent or opaque have been used. Daylight fluorescent pigments have been used. Horizon Blue Z-19, Signal Green Z-18, Aurora Pink Z-11 and Saturn Yellow Z-16 supplied by Dayglo Color Corp. may be used separately or in combination with other colorants. The pupil area inside the iris ring 3 FIGS. 1 and 2 may be colored with a transparent colorant to provide a pleasing appearance.

Colorants are prepared by mixing with a liquid carrier. The lens monomer may be used or a solvent such as a hydrocarbon or alcohol.

Figure 3:
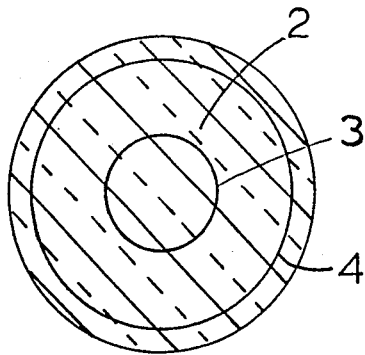
FIG. 3 shows the lens from the front with the colorant in the lens.

Colorants 2 FIG. 2 are applied to the mold surface 6 FIG. 2 by a simple printing process. A soft rubber ball having a radius shorter than the mold radius 6 FIG. 2 is coated with the colorant solvent mixture in the areas corresponding to the area of the lens to be colored, the soft rubber ball is then pressed into the concave mold leaving the colorant 2 FIG. 2 on the mold surface 6 FIG. 2. Liquid lens monomer is added to the concave mold and the mold is rotated to form the concave optical surface 7 FIG. 2. The liquid lens monomer is allowed to dissolve the colorant layer 2 FIG. 4. The lens monomer is allowed to polymerize forming a solid lens having a convex curve formed by the mold surface 6 FIG. 4 and the concave surface 7 formed by centrifugal force and gravity. The lens diameter is controlled by the ring 5 FIG. 4 the location and shape of the colored area is controlled by the edges 3 and 4 FIG. 4 of the colored area 2 FIG. 4. The solid lens is removed from the spin cast mold, the colored area 2 FIG. 3 has an inner circular edge 3 FIG. 3 and an outer edge 4 FIG. 3, the edge ring and center pupil area being clear. The colored contact lens having a clear pupil and clear periphery was made by spin casting.

A second color can be added to the central pupil area before the lens monomer is added. Hand painting can also be used to provide a multicolored iris pattern.

Molding methods other than spin casting have been used. Double molding wherein a concave and convex mold are used to form the two optical surfaces can be used by placing the colorant on either the concave or convex surfaces. A transparent dye may be placed on one surface covering the pupil area and a translucent opaque of fluorescent colorant placed on the other surface leaving the pupil area open. This provides a lens having an iris pattern and a transparent colored pupil area. Examples of double molding are U.S. Pat. Nos. 4,208,364 and 4,197,266. The colorants which are oil soluble and soluble in the lens liquid monomer are not water soluble and therefore cannot be added to the finished lens. The dyes are dissolved by the liquid monomer from the mold surface before the liquid monomer is polymerized to form the solid lens. The colorants then become part of the polymer and are locked in its structure. The coloring method is useful with all known methods of casting optical lenses.

Antimicrobial agents may be added to the monomer before polymerization and locked into the polymeric structure of the lens. These agents prevent the growth of micro-organisms on the lens surface and eliminate the need for disinfecting Examples of useful antimicrobial agents are: 3-(trimethoxysilyl)propylocta decyldimethyl ammonium chloride, known as Dow Corning 5700 and hexachlorophene.

It should be understood that the invention is not limited to the exact details of construction shown and described herein for obvious modifications will occur to persons skilled in the art.

I claim:

1. A method of coloring selected areas of spin cast contact lenses by the steps of providing a concave spin cast mold having a concave radius equal to the convex lens radius, placing a dye soluble in the lens monomer on the selected areas of the concave mold surface, placing the liquid lens monomer on the concave spin cast mold surface, rotating the spin cast mold around the lens optical axis and perpendicular to the concave spin cast mold surface, allowing the liquid lens monomer to dissolve the soluble dye present on the concave mold surface, allowing the liquid lens monomer containing the soluble dye to polymerize and form a solid contact lens and the dye being contained within the selected areas of the lens, removing the colored lens from the spin cast mold.

2. A method of casting lenses having a selected area of color by the steps of placing a colorant soluble in the liquid lens monomer on a selected area of the lens mold optical surface, adding the liquid lens monomer to the optical lens mold, allowing the liquid lens monomer to dissolve the colorant from the lens mold optical surface, allowing the liquid lens monomer to polymerize to form a solid lens containing the colorant in the selected area of the lens, removing the lens from the lens mold.

3. A method of casting lenses having a selected area of color by the steps of placing a colored pigment soluble in the liquid lens monomer on a selected area of the lens mold optical surface, adding the liquid lens monomer to the optical lens mold, allowing the liquid lens monomer to dissolve the colored pigment from the mold optical surface, allowing the liquid lens monomer to polymerize to form a solid lens containing the colored pigment in the selected area of the lens, removing the lens from the mold.

4. The subject matter set forth in claim 1 wherein the dye is replaced with a pigment.

5. The subject matter set forth in claim 1 wherein the dye is replaced with a fluorescent pigment.

6. A method as in claim 2 wherein the colorant is a dye.

7. A method as in claim 2 wherein the colorant is a pigment.

8. A method as in claim 2 wherein the colorant is a fluorescent pigment.

9. A method as in claim 3 wherein the pigment is replaced with a dye.

10. A method as in claim 3 wherein the pigment is replaced with a fluorescent pigment.

11. A method as in claim 1 wherein a transparent dye is placed in the central pupil area and a pigment is placed in the iris area.

12. A method as in claim 2 wherein a transparent dye is placed in the central pupil area and a pigment is placed in the iris area.

13. A method as in claim 3 wherein a transparent dye is placed in the central pupil area and a pigment is placed in the iris area.

14. A method as in claim 1 wherein a transparent dye is placed in the central pupil area and a fluorescent pigment is placed in the iris area.

15. A method as in claim 2 wherein a transparent dye is placed in the central pupil area and a fluorescent pigment is placed in the iris area.

16. A method as in claim 3 wherein a transparent dye is placed in the central pupil area and a fluorescent pigment is placed in the iris area.

* * * * *